United States Patent
Kim et al.

(10) Patent No.: US 11,175,558 B2
(45) Date of Patent: Nov. 16, 2021

(54) LIQUID CRYSTAL CELL

(71) Applicant: LG Chem, Ltd., Seoul (KR)

(72) Inventors: Deok Hwan Kim, Daejeon (KR); Yeon Keun Lee, Daejeon (KR); Jung Doo Kim, Daejeon (KR); Jun Haeng Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/768,971

(22) PCT Filed: Dec. 20, 2018

(86) PCT No.: PCT/KR2018/016314
§ 371 (c)(1),
(2) Date: Jun. 2, 2020

(87) PCT Pub. No.: WO2019/125004
PCT Pub. Date: Jun. 27, 2019

(65) Prior Publication Data
US 2021/0116736 A1    Apr. 22, 2021

(30) Foreign Application Priority Data
Dec. 22, 2017  (KR) .................. 10-2017-0178107

(51) Int. Cl.
*G02F 1/1337* (2006.01)
*G02F 1/137* (2006.01)

(52) U.S. Cl.
CPC .... *G02F 1/13712* (2021.01); *G02F 1/133769* (2021.01)

(58) Field of Classification Search
CPC ................ G02F 1/13712; G02F 1/133769
See application file for complete search history.

(56) References Cited

U.S. PATENT DOCUMENTS

| 4,005,928 A | 2/1977 | Kmetz et al. |
| 2007/0273265 A1 | 11/2007 | Hikmet |
| 2008/0203356 A1 | 8/2008 | Kjellander et al. |

(Continued)

FOREIGN PATENT DOCUMENTS

| JP | H05150274 A | 6/1993 |
| JP | H07104252 A | 4/1995 |

(Continued)

OTHER PUBLICATIONS

Extended European Search Report for Application No. 18893089.5 dated Oct. 28, 2020, 9 pages.

(Continued)

*Primary Examiner* — Donald L Raleigh
(74) *Attorney, Agent, or Firm* — Lerner, David, Littenberg, Krumholz & Mentlik, LLP

(57) ABSTRACT

A liquid crystal cell, a manufacturing method thereof and a use thereof are provided in the present disclosure. The liquid crystal cell is in a normally transparent mode, and has excellent transmittance-variable characteristics in a transparent mode and a scattering mode and excellent haze characteristics in the scattering mode. Such liquid crystal cell may be applied to various light modulation devices, such as a smart window, a window protective film, a flexible display element, a light shielding plate for transparent displays, an active retarder for 3D image displays or a viewing angle control film.

14 Claims, 4 Drawing Sheets

(56) References Cited

U.S. PATENT DOCUMENTS

| | | |
|---|---|---|
| 2014/0336975 A1 | 11/2014 | Kim et al. |
| 2015/0331264 A1 | 11/2015 | Min et al. |
| 2017/0115438 A1 | 4/2017 | Choi et al. |
| 2017/0336663 A1 | 11/2017 | Hakemi et al. |
| 2018/0163460 A1 | 6/2018 | Lin et al. |
| 2018/0373068 A1 | 12/2018 | Lim et al. |
| 2019/0250465 A1 | 8/2019 | Kim et al. |
| 2021/0116736 A1 | 4/2021 | Kim et al. |

FOREIGN PATENT DOCUMENTS

| | | |
|---|---|---|
| JP | 2003149683 A | 5/2003 |
| KR | 20140077861 A | 6/2014 |
| KR | 20160115428 A | 10/2016 |
| KR | 20160117344 A | 10/2016 |
| KR | 20170090236 A | 8/2017 |
| TW | I609213 B | 12/2017 |
| WO | 2016159671 A1 | 10/2016 |

OTHER PUBLICATIONS

International Search Report from Application No. PCT/KR2018/016314 dated Mar. 14, 2019, 2 pages.
International Search Report from Application No. PCT/KR2018/016315 dated Mar. 14, 2019, 2 pages.

[Figure 1]
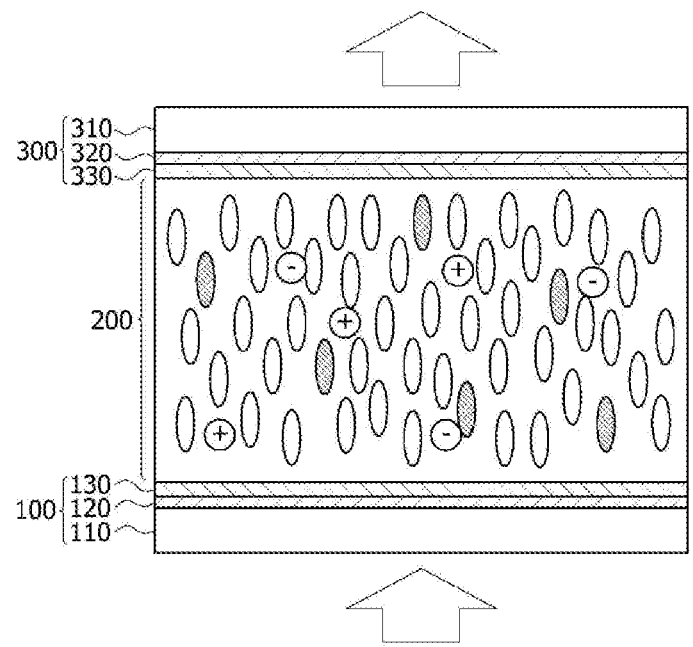
[Figure 2]
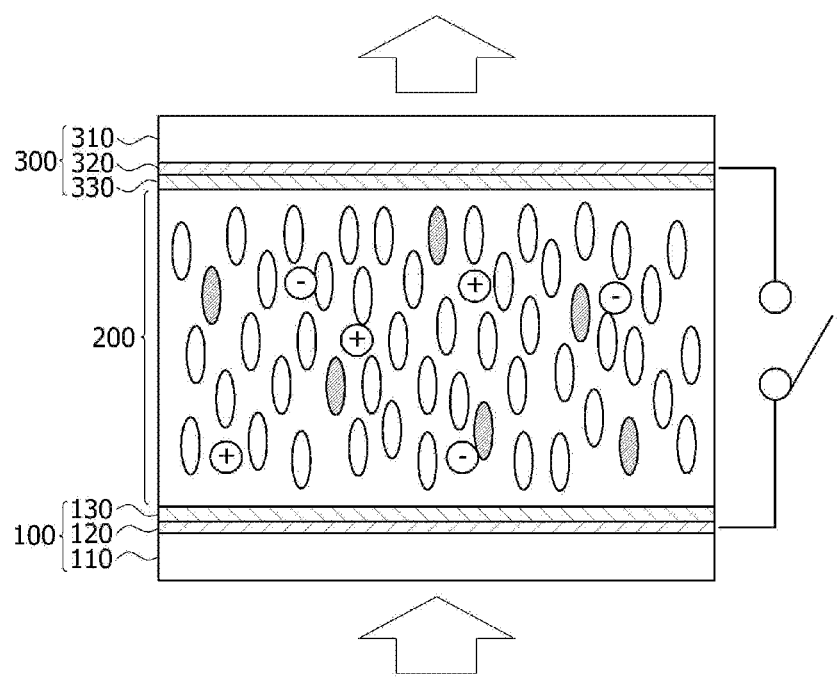

[Figure 3]
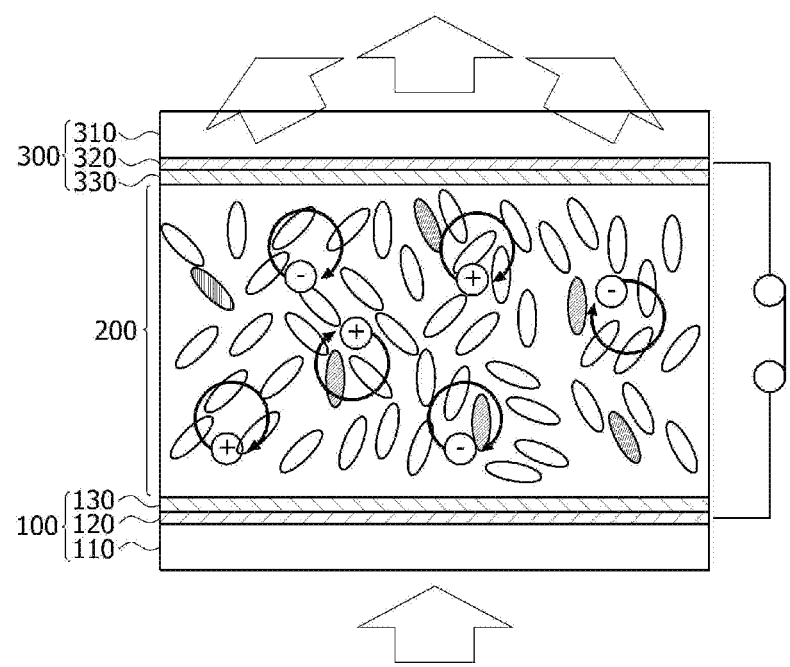

[Figure 4]
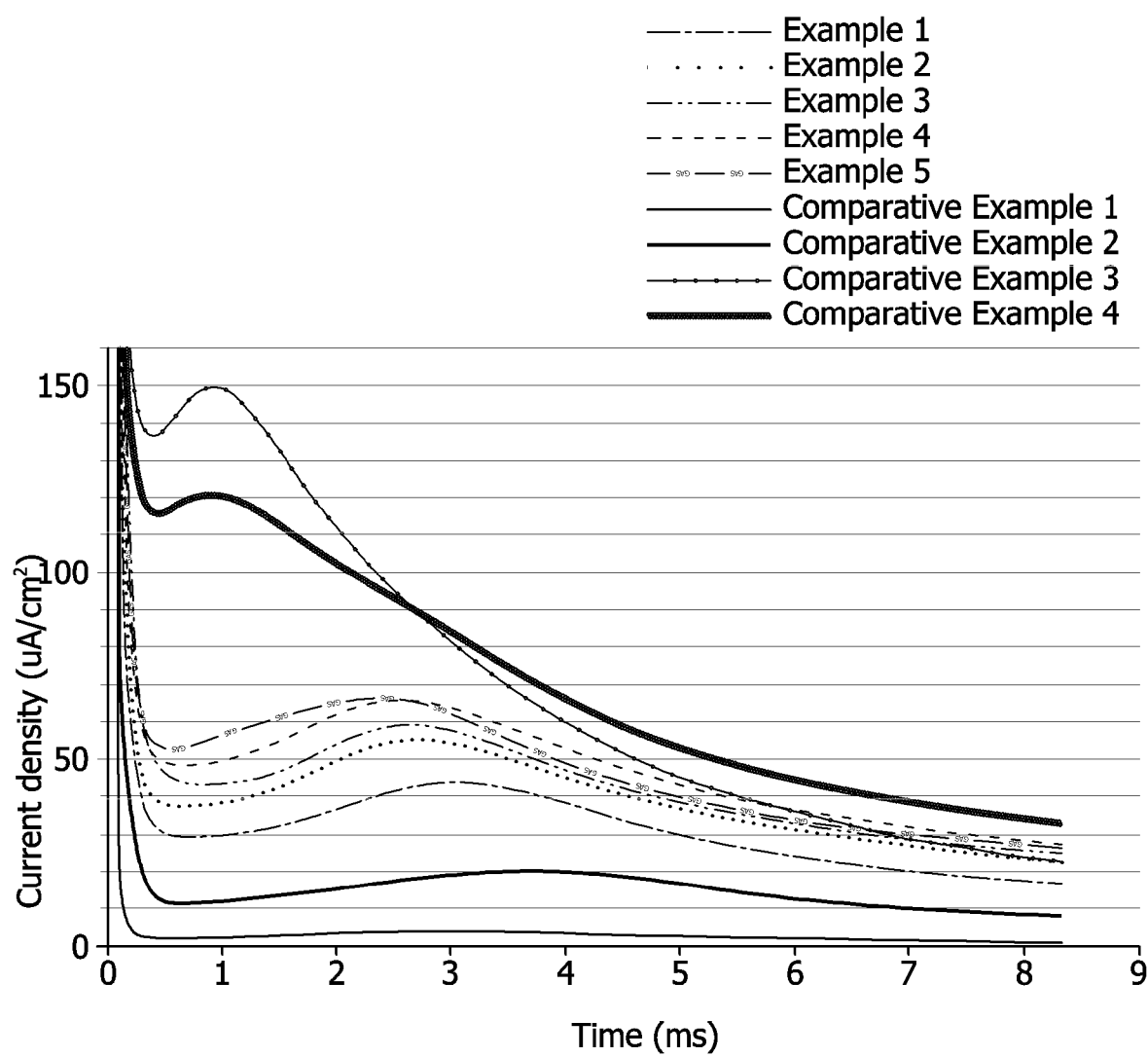

[Figure 5]
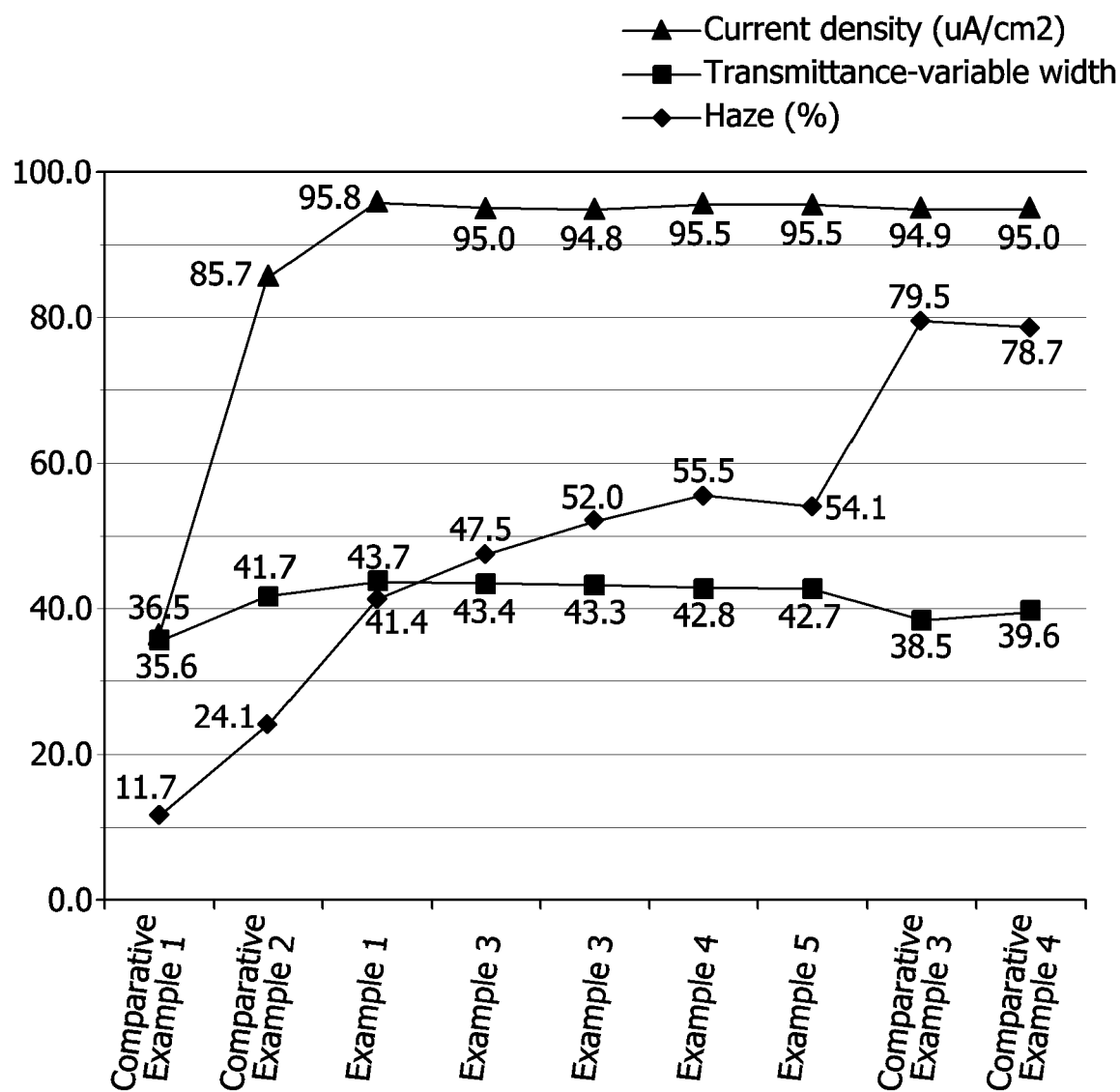

LIQUID CRYSTAL CELL

CROSS-REFERENCE TO RELATED APPLICATION

The present application is a national phase entry under 35 U.S.C. § 371 of International Application No. PCT/KR2018/016314 filed Dec. 20, 2018 which claims priority from Korean Patent Application No. 10-2017-0178107 filed on Dec. 22, 2017, the disclosures of which are incorporated herein by reference in their entirety.

TECHNICAL FIELD

This application relates to a liquid crystal cell, a manufacturing method thereof and a use thereof.

BACKGROUND ART

A normally transparent mode element is, for example, an element implementing the transparent mode in the absence of an external action, wherein it is switched to a black mode under the external action and switched back to the transparent mode when the external action is removed.

Patent Document 1 (Korean Laid-Open Patent Publication No. 10-2014-0077861) discloses a normally transparent mode element capable of varying between a transparent mode and a scattering mode. The element of Patent Document 1 is a so-called PDLC (polymer dispersed liquid crystal) element implemented by dispersing liquid crystals in a polymer matrix, in which since a liquid crystal compound in the PDLC usually exists in an un-oriented state, it is in a scattering state when no voltage is applied, but implements the normally transparent mode by applying a vertical alignment film.

However, the normally transparent mode element using the PDLC of Patent Document 1 has a high driving voltage, and has problems such as residual haze level fluctuation and haze characteristic degradation depending on exposure characteristics, so that there is a need for development of the normally transparent mode element that can compensate for the above problems.

DISCLOSURE

Technical Problem

The present application provides a liquid crystal cell, which is in a normally transparent mode, and has excellent transmittance-variable characteristics in a transparent mode and a scattering mode, and excellent haze characteristics in the scattering mode, a manufacturing method thereof and a use thereof.

Technical Solution

The present application relates to a liquid crystal cell. Hereinafter, the liquid crystal cell of the present application will be described with reference to the accompanying drawings, where the accompanying drawings are exemplary, and the liquid crystal cell of the present application is not limited to the accompanying drawings.

FIG. 1 exemplarily shows a liquid crystal cell according to one example of the present application. As shown in FIG. 1, the liquid crystal cell comprises two substrates (100, 300) disposed opposite to each other; and a liquid crystal layer (200) existing between the two substrates (100, 300).

The liquid crystal cell may implement a normally transparent mode element. In this specification, the term "normally transparent mode element" may mean an element which implements a transparent mode in a state where there is no external action (that is, an initial state or a normal state), and is switched to a scattering mode under the external action and switched back to the transparent mode when the external action is removed. In the present application, the term "external action" means all kinds of actions which are performed so that alignment of the liquid crystal compound can be changed, where a representative example is voltage application.

In one example, when a predetermined voltage or more is applied to the liquid crystal cell, rotational force is generated in non-reactive liquid crystals due to an induced electric field action caused by polarization of a conductivity control agent included in the liquid crystal layer (200) with the applied external electric field, whereby swirling currents may occur. In order to generate the swirling currents, the conductivity control agent should have a concentration higher than or equal to a predetermined level, where the concentration of the conductivity control agent may be evaluated as an average current density.

For example, the liquid crystal layer (200) may have an average current density of 30 $\mu A/cm^2$ to 60 $\mu A/cm^2$. Specifically, the lower limit of the average current density in the liquid crystal layer (200) may be 33 $\mu A/cm^2$ or more, 36 $\mu A/cm^2$ or more, 39 $\mu A/cm^2$ or more, or 40 $\mu A/cm^2$ or more, and the upper limit of the average current density in the liquid crystal layer (200) may be 59 $\mu A/cm^2$ or less, 58 $\mu A/cm^2$ or less, 57 $\mu A/cm^2$ or less, or 56 $\mu A/cm^2$ or less. In this specification, the "current density" means an amount of an electric current flowing through a unit area, and in this specification, the "average current density" means an average value of current densities measured for a specific time after applying a voltage having a specific intensity and frequency to a liquid crystal cell. In this specification, the "cycle" means a period in which a specific voltage is applied when an alternating-current voltage is applied. In one example, the current density may be a value measured in a fifth cycle, which is a time point when it is determined to have been stabilized, as the current density tends to be over-measured when measured immediately after application of an alternating-current voltage. The average current density of the liquid crystal layer (200) according to one example may be an average value of current densities measured from 64 ms (milliseconds) to 72 ms, that is, from 0 ms to 8 ms of the fifth cycle after applying an alternating-current voltage at a voltage of 40 V and a frequency of 60 Hz to the liquid crystal cell. As the liquid crystal layer (200) satisfies the average current density within the above-described range, it is possible to provide a liquid crystal cell which is in a normally transparent mode and has excellent transmittance-variable characteristics in a transparent mode and a scattering mode, and excellent haze characteristics in the scattering mode. When the average current density of the liquid crystal layer (200) is too low, the concentration of the conductivity control agent is low, so that the swirling currents of the conductivity control agent are not sufficiently generated, and thus the haze characteristics may be lowered. In addition, when the average current density of the liquid crystal layer (200) is too high, the haze characteristics may be excellent, but the difference between the transmittance in the initial state and the transmittance upon application of a voltage of 60 V may decrease, which may adversely affect enlargement of the liquid crystal cell area. The average current density of the liquid crystal layer may be adjusted according to the composition of the liquid crystal layer or the heating time.

The current density may be measured by a semiconductor characteristic analyzer, and the current density according to one embodiment has been measured using a DSLC cell Keithly 4200 semiconductor characteristic analyzer. The driving waveform of the semiconductor characteristic analyzer may have a period of 0.0010 sec to 0.0300 sec, a pulse width of 0.00500 sec to 0.01000 sec, a rise time of 0.00001 sec to 0.00020 sec, a fall time of 0.00001 sec to 0.00020. sec, a base voltage of −60 V to −20 V, and an amplitude of 50 V to 100 V. Specifically, the driving waveform of the semiconductor characteristic analyzer may have a period of 0.0100 sec to 0.0250 sec or 0.0150 sec to 0.0200 sec, a pulse width of 0.00600 sec to 0.00950 sec, 0.00700 sec to 0.00900 sec or 0.00800 sec to 0.00850 sec, a rise time of 0.00004 sec to 0.00016 sec or 0.00008 sec to 0.00012 sec, a fall time of 0.00004 sec to 0.00016 sec or 0.00008 sec to 0.00012 sec, a base voltage of −55 V to −25 V, −50 V to −30 V or −45 V to −35 V, and an amplitude of 60 V to 95 V, 70 V to 90 V or 75 V to 85 V.

The period means a time taken for a single reciprocating movement to take place around the vibration center in a vibration phenomenon or for fluctuation of a physical value to occur once. The pulse width means an interval at the time when the amplitude becomes ½ in the rise time and the fall time of a pulse. The rise time means a time between 10% and 90% of the maximum value during the period when a pulse wave increases from the minimum value to the maximum value. The fall time means a time during which the pulse wave reaches from 90% to 10% of the maximum value during the period when it reaches from the maximum value to the minimum value. The base voltage means a voltage at 0 seconds before applying a specific voltage upon measuring a current density. The amplitude means a distance or displacement that moves maximally from the center of vibration when there is periodic vibration.

The liquid crystal layer (200) may comprise non-reactive liquid crystals. The non-reactive liquid crystals in the liquid crystal layer (200) may perform a function of varying transmittance by changing an orientation depending on whether or not an external action, for example, an external voltage is applied. As the non-reactive liquid crystals, all kinds of liquid crystal compounds may be used as long as their orientation can be changed by application of an external action. For example, a smectic liquid crystal compound, a nematic liquid crystal compound or a cholesteric liquid crystal compound may be used as the liquid crystal compound. In addition, the liquid crystal compound may be, for example, a compound having no polymerizable group or crosslinkable group so that the orientation direction thereof can be changed by application of an external action.

In one example, the non-reactive liquid crystals may have negative dielectric constant anisotropy. In this specification, the term "dielectric constant anisotropy ($\Delta\varepsilon$)" may mean a difference ($\varepsilon// - \varepsilon\perp$) between the horizontal dielectric constant ($\varepsilon//$) and the vertical dielectric constant ($\varepsilon\perp$) of liquid crystals. In this specification, the term "horizontal dielectric constant ($\varepsilon//$)" means a dielectric constant value measured along the direction of an electric field in a state where a voltage is applied so that the director of the liquid crystal and the direction of the electric field by the applied voltage are substantially horizontal, and the "vertical dielectric constant ($\varepsilon\perp$)" means a dielectric constant value measured along the direction of an electric field in a state where a voltage is applied so that the director of the liquid crystal and the direction of the electric field by the applied voltage are substantially perpendicular.

In one example, the absolute value of the dielectric constant anisotropy ($\Delta\varepsilon$) of the non-reactive liquid crystals may be, for example, in a range of about 1 to 10. The lower limit of the absolute value of the dielectric constant anisotropy ($\Delta\varepsilon$) of the non-reactive liquid crystals may be 1 or more, 2 or more, 3 or more, or 4 or more, and the upper limit of the absolute value of the dielectric constant anisotropy ($\Delta\varepsilon$) of the non-reactive liquid crystals may be 10 or less, 9 or less, 8 or less, 7 or less, 6 or less, or 5 or less. When the dielectric constant anisotropy of the non-reactive liquid crystals satisfies the above range, it is advantageous in implementing a liquid crystal cell switching between a transparent mode and a scattering mode, because it can be driven with a low driving voltage and exhibit excellent haze characteristics.

In one example, the refractive index anisotropy of the non-reactive liquid crystals may be appropriately selected in consideration of the desired physical properties, for example, the haze characteristics of the liquid crystal cell. In the present application, the term "refractive index anisotropy" may mean a difference between an ordinary refractive index and an extraordinary refractive index of non-reactive liquid crystals. The extraordinary refractive index may mean a refractive index with respect to the optical axis of the non-reactive liquid crystal, and the ordinary refractive index may mean a refractive index with respect to a direction perpendicular to the optical axis of the non-reactive liquid crystal. The lower limit of the refractive index anisotropy of the liquid crystal compound may be, for example, 0.1 or more, 0.12 or more, 0.14 or more, 0.16 or more, 0.18 or more, or 0.19 or more, and the upper limit of the refractive index anisotropy of the liquid crystal compound may be 0.3 or less, 0.28 or less, 0.26 or less, 0.24 or less, 0.22 or less, or 0.2 or less. When the refractive index anisotropy of the non-reactive liquid crystals satisfies the above range, it is possible, for example, to implement a normally transparent mode element having excellent haze characteristics. Also, in this specification, the term "optical axis" may mean an axis in the long axis direction of a liquid crystal when the liquid crystal is in the shape of a rod, and may mean an axis in the normal direction of the plane of a disc when the liquid crystal is in a disc shape.

The liquid crystal layer (200) may further comprise a conductivity control agent. According to one example of the present application, the liquid crystal layer (200) may be a liquid crystal layer driven in a dynamic scattering mode. The dynamic scattering mode may mean a liquid crystal mode inducing an electrohydrodynamic instability (EHDI) state. In general, the dynamic scattering mode liquid crystal layer comprises non-reactive liquid crystals in a nematic or smectic phase and a conductivity control agent that induces EHDI, and when an electric field is applied to the liquid crystal layer (200), convection occurs by the EHDI, and when the electric field is increased, new convection structures are successively created, whereby the light is strongly scattered by optical anisotropy and fluid motion of the liquid crystals, while changing into the final turbulence.

In one example, when the conductivity control agent is included in the liquid crystal layer (200), the conductivity control agent may be included in a ratio of 0.1 parts by weight to 20 parts by weight relative to 100 parts by weight of the non-reactive liquid crystals. Specifically, the conductivity control agent may be included in a ratio of 0.1 parts by weight to 15 parts by weight, 0.1 parts by weight to 10 parts by weight, 0.1 parts by weight to 5.5 parts by weight, 0.1 parts by weight to 5 parts by weight or 0.1 parts by weight to 2.5 parts by weight relative to 100 parts by weight of the non-reactive liquid crystals. By comprising the conductivity control agent in the ratio of the above-described range in the liquid crystal layer (200), excellent haze characteristics can be exhibited in the scattering mode and the physical properties of the liquid crystal layer can be stably maintained.

The conductivity control agent that induces the EHDI may comprise, for example, one or more selected from an anisotropic dye, a reactive monomer and an ionic compound. The reactive monomer may be reactive liquid crystals. In one example, the liquid crystal cell may comprise an anisotropic dye, reactive liquid crystals and an ionic compound, as the conductivity control agent, in the liquid crystal layer (200), and in another example, the liquid crystal cell may comprise an anisotropic dye, reactive liquid crystals and an ionic compound, as the conductivity control agent, in the liquid crystal layer (200).

The anisotropic dye may contribute to the transmittance variation by improving a light shielding ratio of the liquid crystal cell. In this specification, the term "dye" may mean a material capable of intensively absorbing and/or modifying light within at least a part or all of the entire range in a visible light region, for example, a wavelength range of 400 nm to 700 nm. Furthermore, in this specification, the term "anisotropic dye" may mean a material capable of anisotropic absorption of light in at least a part or the entire range of the visible light region. As the anisotropic dye, for example, a known dye known to have the characteristics that can be aligned according to the alignment state of the liquid crystal can be selected and used, and for example, a black dye can be used. Such a black dye is known, for example, as an azo dye or an anthraquinone dye, but is not limited thereto.

When the anisotropic dye is included in the liquid crystal layer (200), the anisotropic dye may be included in a ratio of 0.1 parts by weight to 2 parts by weight relative to 100 parts by weight of the non-reactive liquid crystals. Specifically, the anisotropic dye may be included in a ratio of 0.1 parts by weight to 1.8 parts by weight, 0.1 parts by weight to 1.6 parts by weight, 0.1 parts by weight to 1.4 parts by weight, 0.1 parts by weight to 1.2 parts by weight, 0.1 parts by weight to 1.0 part by weight or 0.1 parts by weight to 0.8 parts by weight relative to 100 parts by weight of the non-reactive liquid crystals. By comprising the anisotropic dye in the ratio of the above-described range in the liquid crystal layer (200), it is possible to contribute to the transmittance variation by improving the light shielding ratio of the liquid crystal cell.

As the reactive monomer, reactive liquid crystals having good mixing properties with the liquid crystals may be used as described above, and the reactive liquid crystals may be referred to as a reactive mesogen. In this specification, the reactive mesogen may mean a compound containing a moiety capable of exhibiting liquid crystal, for example, a mesogen skeleton, and also one or more reactive functional groups. The reactive functional group may be exemplified by, for example, a polymerizable functional group or a crosslinkable functional group. The reactive functional group may be exemplified by an acryloyl group, an acryloyloxy group, a methacryloyl group, a methacryloyloxy group, a carboxyl group, a hydroxy group, a vinyl group, an epoxy group and the like, but is not limited thereto, which may include known functional groups known as polymerizable groups. The reactive mesogen may include a polyfunctional reactive mesogen or a monofunctional reactive mesogen. In this specification, the term "polyfunctional reactive mesogen" may mean a compound containing two or more reactive functional groups of the mesogens. In one example, the polyfunctional reactive mesogen may comprise 2 to 10, 2 to 8, 2 to 6, 2 to 5, 2 to 4, 2 to 3 or 2 reactive functional groups. In addition, the term "monofunctional reactive mesogen" may mean a compound containing one reactive functional group of the mesogens.

When the reactive monomer is included in the liquid crystal layer (200), the reactive monomer may be included in a ratio of 0.5 parts by weight to 15 parts by weight relative to 100 parts by weight of the non-reactive liquid crystals. Specifically, the reactive monomer may be included in a ratio of 0.5 parts by weight to 12 parts by weight, 0.5 parts by weight to 10 parts by weight, 0.5 parts by weight to 5 parts by weight, 0.5 parts by weight to 2.5 parts by weight or 0.5 parts by weight to 1 part by weight relative to 100 parts by weight of the non-reactive liquid crystals. By comprising the reactive monomer in the ratio of the above-described range in the liquid crystal layer (200), it is possible to form a liquid crystal layer having excellent physical properties while effectively securing conductivity.

In this specification, the ionic compound may mean a compound in the form of a salt in which ions having opposite charges, for example, a cation and an anion, are formed by an ionic bond. The ionic compound may be electrically neutral. Such an ionic compound may be exemplified by, for example, a nitrogen-containing onium salt, a sulfur-containing onium salt or a phosphorus-containing onium salt, and the like, but is not limited thereto. Specifically, an ionic impurity, an ionic liquid or a salt may be used as the ionic compound, and for example, 2,2,6,6-tetramethylpiperidine-1-oxy free radical may be used as the ionic impurity; $TMAPF_6$(trimethylaluminum-hexafluorophosphate) or BMIN-B $F_4$ ([1-butyl-3-methylimideazolium]B $F_4$) may be used as the ionic liquid; and CTAB (cetrimonium bromide), CTAI (cetrimonium iodide) or $CTAI_3$ (cetrimonium triiodide) may be used as the salt.

When the ionic compound is included in the liquid crystal layer (200), the ionic compound may be included in a ratio of 0.1 parts by weight to 2 parts by weight relative to 100 parts by weight of the non-reactive liquid crystals. Specifically, the ionic compound may be included in a ratio of 0.1 parts by weight to 1.5 parts by weight, 0.1 parts by weight to 1.2 parts by weight, 0.1 parts by weight to 1.0 parts by weight or 0.1 parts by weight to 0.5 parts by weight relative to 100 parts by weight of the non-reactive liquid crystals. By comprising the ionic compound in the ratio of the above-described range in the liquid crystal layer (200), it is possible to effectively secure the conductivity of the liquid crystal layer, where the ionic compound may comprise a small amount of the above-described range in consideration of the solubility in the liquid crystal compound.

In one example, when the liquid crystal layer (200) comprises both a reactive monomer and an ionic compound, the weight ratio of the reactive monomer and the ionic compound may be 2.5:1 to 150:1. Specifically, the weight ratio of the reactive monomer and the ionic compound may be 2.5:1 to 130:1, 2.5:1 to 100:1, 2.5:1 to 80:1, 2.5:1 to 50:1, 2.5:1 to 30:1 or 2.5:1 to 10:1. By comprising the ionic compound in the ratio of the above-described range in the liquid crystal layer (200), it is possible to form a liquid crystal layer having excellent physical properties while effectively securing conductivity.

The liquid crystal cell may switch between a transparent mode and a scattering mode by adjusting the initial alignment state of the non-reactive liquid crystals and applying an external action such as a voltage. For example, when the non-reactive liquid crystals are present in a vertically aligned state, the liquid crystal cell may exhibit the transparent mode, and when the non-reactive liquid crystals are present in an irregularly arranged state, the liquid crystal cell may exhibit the scattering mode.

In this specification, the term "scattering mode" may mean a mode in which a liquid crystal cell exhibits haze in a predetermined level or more, and the term "transparent mode" may mean a state in which light can be transmitted or a mode in which it exhibits haze in a predetermined level or less.

For example, in the scattering mode, the liquid crystal cell may have haze of 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more. In the transparent mode, the liquid crystal cell may have, for example, haze of less than 10%, 8% or less, 6% or less, or 5% or less.

The haze may be a percentage of the transmittance of the diffused light to the transmittance of the total transmitted light passing through a measurement object. The haze can be evaluated using a haze meter (NDH-5000SP). The haze can be evaluated in the following manner using the haze meter. That is, the light is transmitted through the measurement object and is incident into an integrating sphere. In this process, the light is divided into diffused light (DT) and parallel light (PT) by the measurement object, and these lights are reflected in the integrating sphere and collected by a light receiving element, and the haze can be measured through the collected light. That is, the total transmitted light (TT) by the process is the sum (DT+PT) of the diffused light (DT) and the parallel light (PT), and the haze can be defined as a percentage of the diffused light to the total transmitted light (Haze (%)=100XDT/TT).

The liquid crystal cell may be in a transparent mode in a state where no external action is applied, and may be switched to a scattering mode when an external action is applied. The liquid crystal cell may exist in a state where the liquid crystal layer (200) is vertically oriented when no external action is applied.

FIGS. 2 and 3 exemplarily show each driving of a transparent mode and a scattering mode in a liquid crystal cell of the present application. As shown in FIG. 2, in the initial state, that is, the state in which no external action is applied, the non-reactive liquid crystals may exist in a state vertically oriented to the plane of the liquid crystal layer (200), and may implement the transparent mode (A). When an external action, for example a vertical electric field, is applied in this initial state, as shown in FIG. 3, the non-reactive liquid crystals may be switched to the scattering mode (B) while having an irregular arrangement state by the EHDI caused by the conductivity control agent. Here, when the vertical electric field is removed, it may be switched to the transparent mode of the initial state. In one example, the switching from the transparent mode to the scattering mode can be performed, for example, by applying a vertical electric field of about 1 to 500 Hz or about 1 to 100 Hz, which may also be appropriately changed as necessary, for example, in consideration of haze characteristics.

In one example, the liquid crystal layer (200) may have a difference between the transmittance in the initial state and the transmittance at the time of applying a voltage of 60V of 40% or more. Hereinafter, in this specification, the "difference between the transmittance in the initial state and the transmittance at the time of applying a voltage of 60V" has been defined as a transmittance-variable width. Specifically, the transmittance-variable width of the liquid crystal layer (200) may be 41% or more, or 42% or more, and the upper limit of the transmittance-variable width of the liquid crystal layer (200) may be 45%. As the liquid crystal layer (200) has an excellent transmittance-variable width within the above range, the liquid crystal cell may have excellent driving characteristics.

For example, the transmittance of the liquid crystal layer (200) in the initial state may be 60% to 95%, and specifically, the transmittance of the liquid crystal layer (200) in the initial state may be 60% to 90%, 60% to 80% or 60% to 70%. In addition, the transmittance of the liquid crystal layer (200) at the time of applying a voltage of 60 V may be 15% to 50%, and specifically, the transmittance of the liquid crystal layer (200) at the time of applying a voltage of 60 V may be 15% to 45%. 15% to 35% or 15% to 26%.

The liquid crystal layer (200) may express haze by a difference in refractive indexes between domains of the non-reactive liquid crystals present in the liquid crystal layer (200) when a voltage of 60V is applied. The refractive index means a refractive index for light having a wavelength of about 550 nm, unless otherwise specified.

For example, the liquid crystal layer (200) may have haze of 90% or more when a voltage of 60V is applied. Specifically, the haze of the liquid crystal layer (200) at the time of applying a voltage of 60 V may be 91% or more, 92% or more, 93% or more, or 94% or more, and the upper limit of the haze of the liquid crystal layer (200) at the time of applying a voltage of 60 V may be 98% or less. The liquid crystal layer (200) has haze in the aforementioned range when a voltage of 60V is applied, whereby the liquid crystal cell may have excellent light shielding characteristics in a scattering mode.

In addition, the liquid crystal layer (200) may have haze of 9% or less in an initial state. Specifically, the haze of the liquid crystal layer (200) in the initial state may be 8% or less, 6% or less, or 5% or less, and the lower limit of the haze of the liquid crystal layer (200) in the initial state may be 0.4% or more. The liquid crystal layer (200) has haze in the aforementioned range in the initial state, whereby the liquid crystal cell may have excellent transmission characteristics in a normally transparent mode.

The two substrates (100, 300) may comprise electrode layers (120, 320) and vertical alignment films (130, 330), respectively. Specifically, the two substrates (100, 300) may sequentially comprise base materials (110, 310), and electrode layers (120, 320) and vertical alignment films (130, 330) on the base materials (110, 310), respectively.

As the base materials (110, 310), those having optical transparency can be used. For example, as the base materials (110, 310), glass or a plastic film or sheet, which is optically transparent, can be used. Specifically, the plastic film or sheet can be exemplified by a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) or PP (polypropylene) film or sheet; a PVA (polyvinyl alcohol) film or sheet; a PES (poly ether sulfone) film or sheet; a PEEK (polyether ether ketone) film or sheet; a PEI (polyetherimide) film or sheet; a PEN (polyethylenenaphthatate) film or sheet; a polyester film or sheet such as a PET (polyethyleneterephtalate) film or sheet; a PI (polyimide) film or sheet; a PSF (polysulfone) film or sheet; a PAR (polyarylate) film or sheet; or a fluorine-based resin film or sheet, and the like, and generally, a cellulose film or sheet, a polyester film or sheet, or an acrylic film or sheet, and the like can be used, and preferably, a TAC film or sheet can be used, but it can be suitably selected in consideration of the purpose of the present application.

The electrode layers (120, 320) may apply an electric field to the liquid crystal layer (200) to switch the alignment state of the liquid crystal layer (200). As the electrode layers (120, 320), a transparent conductive layer may be used. For example, as the electrode layers (120, 320), one formed by depositing a conductive polymer, a conductive metal, a conductive nanowire or a metal oxide such as ITO (indium tin oxide), and the like may be used. In one example, indium tin oxide (ITO) may be used as the electrode layers (120, 320).

As the vertical alignment films (130, 330), any alignment film having vertical alignment capability to an adjacent liquid crystal layer may be selected without particular limitation. For example, a contact alignment film such as a rubbing alignment film or an alignment film, which comprises a photo-alignment film compound, known to be capable of exhibiting orientation characteristics by a non-contact method such as irradiation of linearly polarized light can be used.

The present application also relates to a method for manufacturing a liquid crystal cell. The method for manufacturing a liquid crystal cell relates to, for example, the manufacturing method for manufacturing the above-described liquid crystal cell. Therefore, the contents described in the liquid crystal cell may be equally applied to the details of the method for manufacturing a liquid crystal cell, which are described below. The liquid crystal cell manufactured by the above method may have an excellent difference between the transmittance in the initial transparent mode and the transmittance in the scattering mode when a voltage is applied, and express excellent haze in the scattering mode.

The method for manufacturing a liquid crystal cell of the present application relates to a liquid crystal cell comprising two substrates disposed opposite to each other and a liquid crystal layer existing between the two substrates. The method for manufacturing a liquid crystal cell may be a method for manufacturing the above-described liquid crystal cell.

The method for manufacturing a liquid crystal cell may comprise a step of adjusting an average current density of the liquid crystal layer to 30 $\mu$A/cm$^2$ to 60 $\mu$A/cm$^2$ (provided that the average current density is an average value of current densities measured from 0 ms to 8 ms of the fifth cycle after applying an alternating-current voltage at a voltage of 40 V and a frequency of 60 Hz to the liquid crystal cell). By adjusting the average current density of the liquid crystal layer in the above-described range, the liquid crystal cell may have an excellent difference between the transmittance in the initial transparent mode and the transmittance in the scattering mode when a voltage is applied, and express excellent haze in the scattering mode.

If the step of adjusting the average current density of the liquid crystal layer as described above is included, the liquid crystal cell may be manufactured by a known method without particular limitation, and in one example, the liquid crystal cell may be manufactured by injecting the heated liquid crystal composition between two substrates and sealing the edges.

As the method of adjusting an average current density of the liquid crystal layer, a method of appropriately selecting compositions and contents included in the liquid crystal composition and adjusting heating conditions may be applied.

In one example, when the liquid crystal composition comprises non-reactive liquid crystals, and an anisotropic dye, reactive liquid crystals and an ionic compound, as a conductivity control agent and the reactive liquid crystals are included in an amount of 8 wt % to 12 wt %, the average current density of the liquid crystal layer can be adjusted in the above-described range by heating the liquid crystal composition at a temperature of 90° C. to 110° C. for 20 hours to 30 hours. Specifically, when the reactive liquid crystals are included in an amount of 8 wt % to 12 wt %, the average current density of the liquid crystal layer can be adjusted in the above-described range by heating the liquid crystal composition at a temperature of 93° C. to 107° C., 95° C. to 105° C. or 98° C. to 102° C. for 20 hours to 30 hours, 21 hours to 28 hours, 22 hours to 27 hours or 23 hours to 26 hours. By adjusting the average current density of the liquid crystal layer in the above-described range under the above-described conditions, the liquid crystal cell may have an excellent difference between the transmittance in the initial transparent mode and the transmittance in the scattering mode when a voltage is applied, and express excellent haze in the scattering mode.

In another example, when the liquid crystal composition comprises non-reactive liquid crystals, and an anisotropic dye, reactive liquid crystals and an ionic compound, as a conductivity control agent and the reactive liquid crystals are included in an amount of 1 wt % to 5 wt %, the average current density of the liquid crystal layer can be adjusted in the above-described range by heating the liquid crystal composition at a temperature of 110° C. to 130° C. for 1 hour to 7 hours. Specifically, when the reactive liquid crystals are included in an amount of 1 wt % to 5 wt %, the average current density of the liquid crystal layer can be adjusted in the above-described range by heating the liquid crystal composition at a temperature of 113° C. to 127° C., 116° C. to 124° C. or 119° C. to 121° C. for 1 hour to 6 hours or 2 hours to 6 hours. By adjusting the average current density of the liquid crystal layer in the above-described range under the above-described conditions, the liquid crystal cell may have an excellent difference between the transmittance in the initial transparent mode and the transmittance in the scattering mode when a voltage is applied, and express excellent haze in the scattering mode.

The present application also relates to a use of the liquid crystal cell. An exemplary liquid crystal cell may have an excellent difference between the transmittance in the initial transparent mode and the transmittance in the scattering mode when a voltage is applied, and express excellent haze in the scattering mode. Such liquid crystal cell may be applied to various light modulation devices such as a smart window, a window protective film, a flexible display element, a light shielding plate for transparent displays, an active retarder for 3D image displays or a viewing angle control film.

Advantageous Effects

The present application can provide a liquid crystal cell which is in a normally transparent mode, and has excellent transmittance-variable characteristics in the transparent mode and a scattering mode and excellent haze characteristics in the scattering mode, and a method for manufacturing the liquid crystal cell. Such liquid crystal cell may be applied to various light modulation devices such as a smart window, a window protective film, a flexible display element, a light shielding plate for transparent displays, an active retarder for 3D image displays or a viewing angle control film.

BRIEF DESCRIPTION OF DRAWINGS

FIG. 1 is a diagram exemplarily showing a liquid crystal cell according to one example of the present application.

FIG. 2 is a diagram exemplarily showing a liquid crystal cell implementing a transparent mode in an initial state according to one example of the present application.

FIG. 3 is a diagram exemplarily showing a liquid crystal cell implementing a scattering mode when a voltage is applied according to one example of the present application.

FIG. 4 is graphs measuring current densities of liquid crystal cells manufactured in Examples and Comparative Examples according to voltage application times.

FIG. 5 is graphs showing average current densities, transmittance-variable widths and haze in a scattering mode of liquid crystal cells prepared in Examples and Comparative Examples.

BEST MODE

Hereinafter, the present application will be described in detail with reference to Examples, but the scope of the present application is not limited by the following Examples.

EXAMPLE 1

Manufacture of Liquid Crystal Cell

After two glass substrates, in which ITO (indium tin oxide) transparent electrode layers and vertical alignment films were sequentially formed, were disposed apart from each other so that the vertical alignment films faced each other and the interval was about 9 μm or so, a liquid crystal composition heated at 100° C. for 24 hours was injected between the two glass substrates disposed apart from each other and the edges were sealed to manufacture a liquid crystal cell having an area of 2.5 cm×3.0 cm and an interval of 9 μm.

Here, the vertical alignment film was formed by coating a vertical alignment composition (Nissan 5661) on the ITO transparent electrode layer and baking it at a temperature of 100° C. for 10 minutes. As shown in Table 1 below, the liquid crystal composition was prepared by mixing commercial liquid crystals LC (HCCH 7262, manufactured by HCCH) having dielectric constant anisotropy of −5.0 and refractive index anisotropy of 0.1995, an anisotropic dye (X12, manufactured by BASF), 4-methoxyphenyl 4-((6-(acryloyloxy)hexyl)oxy) benzoate (HCM-021, manufactured by HCCH) as reactive liquid crystals and CTAB (cetyltrimethylammonium bromide) as an ionic compound at a weight ratio of 90:1.6:10:1 (LC: anisotropic dye: RM: CTAB).

Examples 2 to 5 and Comparative Examples 1 to 4

Manufacture of Liquid Crystal Cell

Liquid crystal cells were manufactured in the same manner as in Example 1, except that the compositions of the liquid crystal compositions and the heating conditions shown in Table 1 below were used.

TABLE 1

| | Liquid crystal composition (weight ratio) | | | | |
|---|---|---|---|---|---|
| | Non-reactive | Conductivity control agent | | | |
| | liquid crystals LC | Anisotropic dye | RM | CTAB | Heating conditions |
| Example 1 | 90 | 1.6 | 10 | 1 | 100° C., 24 hours |
| Example 2 | 90 | 1.4 | 2.5 | 1 | 120° C., 2 hours |
| Example 3 | 90 | 1.4 | 2.5 | 1 | 120° C., 3 hours |
| Example 4 | 90 | 1.4 | 2.5 | 1 | 120° C., 4 hours |
| Example 5 | 90 | 1.4 | 2.5 | 1 | 120° C., 6 hours |
| Comparative Example 1 | 90 | 1.6 | — | — | 100° C., 24 hours |
| Comparative Example 2 | 90 | 1.6 | 10 | — | 100° C., 24 hours |
| Comparative Example 3 | 90 | 1.4 | 2.5 | 1 | 120° C., 9 hours |
| Comparative Example 4 | 90 | 1.4 | 2.5 | 1 | 120° C., 12 hours |

LC: commercial liquid crystals (HCCH 7262, manufactured by HCCH)
Anisotropic dye: X12, manufactured by BASF
RM (reactive liquid crystals): 4-methoxyphenyl 4-((6-(acryloyloxy)hexyl)oxy)benzoate (HCM-021, manufactured by HCCH)
CTAB: cetyltrimethylammonium bromide Evaluation Example 1

Current Density Evaluation

For liquid crystal cells manufactured in Examples and Comparative Examples, the instantaneous current-voltage (I-V) was measured using a semiconductor characteristic analyzer, Keithly 4200, having a driving waveform shown in Table 2 below. Specifically, currents flowing at the time of applying an alternating-current voltage of 40 V and 60 Hz to two substrates disposed opposite to each other in the liquid crystal cells manufactured in Examples and Comparative Examples were measured and shown in FIG. 4. At this time, the current value measured after the fifth cycle (Cycle) was taken for stabilization. After voltage application, the current at 8 ms divided by the area was called the final current density, and the average value of the current densities measured from 0 ms to 8 ms was defined as the average current density. The average value of the measured current densities was shown in Table 3 below.

TABLE 2

| DSLC cell Keithly 4200 driving waveform (60 Hz, 40 V, square waveform) | | |
|---|---|---|
| | Value | Unit |
| Period | 0.0167 | Sec |
| Pulse Width | 0.00833 | Sec |
| Rise Time | 0.0001 | Sec |
| Fall Time | 0.0001 | Sec |
| Base Voltage | −40 | Volt |
| Amplitude | −80 | Volt |

Evaluation Example 2

Haze and Transmittance Evaluation

For the liquid crystal cells manufactured in Examples and Comparative Examples, haze and transmittance were measured by an ASTM method using a haze meter, NDH-5000SP. Specifically, AC power was connected to two substrates disposed opposite to each other so as to apply a vertical electric field to each of the liquid crystal cells manufactured in Examples and Comparative Examples, and the haze in the transparent mode at the time of applying no initial voltage and the scattering mode applying a voltage of 60 V and 60 Hz was measured and shown in Table 3 below. In addition, the transmittance in the transparent mode at the time of applying no initial voltage (0 V) and the transmittance in the scattering mode applying a voltage of 60 V and 60 Hz were measured as the transmittance, and then the difference between them was defined as the transmittance-variable width, as shown in the following equation 1, and shown in Table 3 below.

$$\text{Transmittance-variable width} = T_0 - T_{60} \quad \text{[Equation 1]}$$

In Equation 1 above, $T_0$ is transmittance at the time of applying no initial voltage (0V), and $T_{60}$ means transmittance at the time of applying a voltage of 60 V and 60 Hz.

TABLE 3

| | Average current density ($\mu A/cm^2$) | Initial (0 V) Transmittance (%) | Haze (%) | 60 V Transmittance (%) | Haze (%) | Transmittance-variable width (%) |
|---|---|---|---|---|---|---|
| Example 1 | 41.4 | 65.4 | 0.4 | 21.7 | 95.8 | 43.7 |
| Example 2 | 47.5 | 68.5 | 0.8 | 25.1 | 95 | 43.4 |
| Example 3 | 52.0 | 69.0 | 0.9 | 25.7 | 94.8 | 43.3 |
| Example 4 | 55.5 | 68.4 | 0.9 | 25.6 | 95.5 | 42.8 |
| Example 5 | 54.1 | 68.4 | 1.3 | 25.7 | 95.5 | 42.7 |
| Comparative Example 1 | 11.7 | 63.8 | 0.9 | 28.2 | 36.5 | 35.6 |
| Comparative Example 2 | 24.1 | 64.8 | 0.8 | 23.1 | 85.7 | 41.7 |
| Comparative Example 3 | 79.5 | 68.1 | 1.4 | 29.6 | 94.9 | 38.5 |
| Comparative Example 4 | 78.7 | 67.0 | 1.2 | 27.4 | 95 | 39.6 |

As shown in Table 3 and FIG. 5, as the liquid crystal cells manufactured in Examples 1 to 5 further comprised the conductivity control agent in the liquid crystal layer as compared to the liquid crystal cells manufactured in Comparative Examples 1 and 2, it was confirmed that they exhibited high current densities. Furthermore, as the liquid crystal cells manufactured in Examples 1 to 5 comprising the conductivity control agent in the liquid crystal layer heated for a lower time, that is, for less than 9 hours, as compared to the liquid crystal cells manufactured in Comparative Examples 3 and 4 having the same liquid crystal composition in the liquid crystal layer as that of the liquid crystal cells manufactured in Examples 1 to 5, it was confirmed that they exhibited low average current densities. That is, as the liquid crystal cells manufactured in Examples 1 to 5 satisfied all of the above-described conditions, it was confirmed that they satisfied the average current density of 30 $\mu A/cm^2$ to 60 $\mu A/cm^2$. In addition, as the liquid crystal cells manufactured in Examples 1 to 5 had a higher average current density than the liquid crystal cells manufactured in Comparative Examples 1 and 2, it was confirmed that they expressed high haze in the scattering mode.

In addition, as the liquid crystal cells manufactured in Examples 1 to 5 satisfied the average current density of 30 $\mu A/cm^2$ to 60 $\mu A/cm^2$, it was confirmed that they had more excellent transmittance-variable widths as compared to the liquid crystal cells manufactured in Comparative Examples 1 to 4 without satisfying the above-described average current density range.

EXPLANATION OF REFERENCE NUMERALS 100, 300: substrate
110, 310: base material
120, 320: electrode layer
130, 330: vertical alignment film
200: liquid crystal layer

The invention claimed is:

1. A liquid crystal cell comprising:
two substrates disposed opposite to each other; and
a liquid crystal layer present between the two substrates and having an average current density of 30 $\mu A/cm^2$ to 60 $\mu A/cm^2$, wherein the average current density is an average value of current densities measured by applying an alternating-current voltage at a first voltage of 40 V and a frequency of 60 Hz to the liquid crystal cell from 0 ms to 8 ms after a fifth cycle.

2. The liquid crystal cell according to claim 1, wherein the liquid crystal layer comprises non-reactive liquid crystals and a conductivity control agent.

3. The liquid crystal cell according to claim 2, wherein the non-reactive liquid crystals have negative dielectric constant anisotropy.

4. The liquid crystal cell according to claim 2, wherein the conductivity control agent comprises one or more selected from an anisotropic dye, reactive liquid crystals and or an ionic compound.

5. The liquid crystal cell according to claim 2, wherein the conductivity control agent is included in a ratio of 0.1 parts by weight to 20 parts by weight relative to 100 parts by weight of the non-reactive liquid crystals.

6. The liquid crystal cell according to claim 1, wherein the liquid crystal layer has a transparent mode in an initial state and a scattering mode at the time of applying a second voltage.

7. The liquid crystal cell according to claim 6, wherein the liquid crystal layer has a difference of 40% or more between transmittance in the initial state and transmittance at the time of applying the second voltage of 60V.

8. The liquid crystal cell according to claim 6, wherein the liquid crystal layer has haze of 90% or more at the time of applying the second voltage of 60V.

9. The liquid crystal cell according to claim 1, wherein the two substrates each comprise an electrode layer and a vertical alignment film.

10. A method for manufacturing a liquid crystal cell comprising two substrates disposed opposite to each other and a liquid crystal layer present between the two substrates, wherein the method comprises:
adjusting the liquid crystal layer to have the average current density of 30 $\mu A/cm^2$ to 60 $\mu A/cm^2$, wherein the average current density is an average value of current densities measured by applying an alternating-current voltage at a voltage of 40 V and a frequency of 60 Hz to the liquid crystal cell from 0 ms to 8 ms after a fifth cycle.

11. The method for manufacturing a liquid crystal cell according to claim 10, wherein the liquid crystal cell is manufactured by injecting a heated liquid crystal composition between the two substrates and sealing edges of the heated liquid crystal composition injected between the substrates.

12. The method for manufacturing a liquid crystal cell according to claim 11, wherein the liquid crystal composition comprises:

non-reactive liquid crystals; and an anisotropic dye, reactive liquid crystals and an ionic compound as a conductivity control agent, wherein when the reactive liquid crystals are in an amount of 8 wt % to 12 wt % in the liquid crystal composition, the heated liquid crystal is heated at a temperature of 90° C. to 110° C. for 20 hours to 30 hours.

13. The method for manufacturing a liquid crystal cell according to claim 11, wherein the liquid crystal composition comprises:

non-reactive liquid crystals; and an anisotropic dye, reactive liquid crystals and an ionic compound as a conductivity control agent, wherein when the reactive liquid crystals are in an amount of 1 wt % to 5 wt % in the liquid crystal composition, the heated liquid crystal is heated at a temperature of 110° C. to 130° C. for 1 hour to 7 hours.

14. An optical modulation device comprising the liquid crystal cell of claim 1.

* * * * *